(12) United States Patent
Ettlinger

(10) Patent No.: US 7,124,895 B2
(45) Date of Patent: Oct. 24, 2006

(54) DEVICE FOR CONTINUOUS FILTRATION OF MATERIAL BLENDS

(75) Inventor: Roderich Ettlinger, Augsburg (DE)

(73) Assignee: Ettlinger Kunststoffmaschinen GmbH, Königsbrunn (DE)

( * ) Notice: Subject to any disclaimer, the term of this patent is extended or adjusted under 35 U.S.C. 154(b) by 167 days.

(21) Appl. No.: 11/022,279

(22) Filed: Dec. 21, 2004

(65) Prior Publication Data

US 2005/0161391 A1   Jul. 28, 2005

Related U.S. Application Data

(63) Continuation of application No. PCT/EP2003/005015, filed on May 14, 2003.

(30) Foreign Application Priority Data

Jun. 29, 2002   (DE)   ................ 102 29 406

(51) Int. Cl.
  B29C 47/68   (2006.01)
  B29B 13/10   (2006.01)
  B01D 33/06   (2006.01)
  B01D 33/46   (2006.01)
(52) U.S. Cl. ..................... 210/396; 425/197
(58) Field of Classification Search ............. 210/359, 210/391, 396; 264/37.24; 425/197, 199
  See application file for complete search history.

(56) References Cited

U.S. PATENT DOCUMENTS 2,221,993 A * 11/1940 Oswald ................. 208/38
3,776,242 A * 12/1973 Khan ..................... 460/69
4,470,904 A    9/1984 Gail et al.
5,330,647 A    7/1994 Sulzbach et al.
5,510,030 A *  4/1996 Bacher et al. ........... 210/397
6,378,705 B1   4/2002 Bacher et al.

FOREIGN PATENT DOCUMENTS

| DE | 21 36 850 | 2/1973 |
| DE | 2 324 581 | 12/1974 |
| DE | 27 03 824 | 8/1977 |
| DE | 26 45 704 | 4/1978 |
| DE | 27 10 445 | 9/1978 |
| DE | 29 47 673 A1 | 6/1981 |
| DE | 32 39 030 A1 | 9/1983 |
| DE | 3600492 A1 * | 7/1987 |
| DE | 43 08 685 C2 | 8/1994 |
| EP | 0 411 163 A1 | 2/1991 |
| WO | WO 00/47394 | 8/2000 |

* cited by examiner

Primary Examiner—Fred G. Prince
(74) Attorney, Agent, or Firm—Martin Fleit; Paul D. Bianco; Fleit Kain Gibbons Gutman Bongini & Bianco, P.L.

(57) ABSTRACT

A device for the continuous filtration of material blends, in particular for separating impurities from plastic melts. A housing has a hollow cylindrical filter disposed inside. An inside chamber is disposed inside the filter. An annular chamber is defined by the outer surface of the filter and an inside wall of the housing. A cleaning device removes the impurities retained on the filter by a motor driving about an axis coupled to pivot the filter inside the housing. The cleaning device has at least one wiper for removing in the radial direction impurities retained on the filter. A conveying device transports off the impurities removed from the filter by the wiper. The motor-driven filter and the conveying device are driven separately of each other.

15 Claims, 3 Drawing Sheets

DEVICE FOR CONTINUOUS FILTRATION OF MATERIAL BLENDS

RELATED APPLICATION

This application is a continuation of International application serial no. PCT/EP2003/005015 filed May 14, 2003, the contents of which are here incorporated by reference in their entirety. The benefit of 35 USC § 120 is here claimed.

BACKGROUND OF THE INVENTION

1. Field of the Invention

The subject matter of the present invention relates to a device for the continuous filtration of material blends, in particular for separating impurities from plastic melts.

2. Prior Art

Used plastics and plastic waste normally contain high quantities of foreign substances, e.g., metal parts, paper residues, glass, secondary plastics, etc. As a rule, these foreign substances or impurities must be removed prior to the recycling of the plastics. In many cases, this is accomplished by first plastifying the used plastic materials by heating them and by subsequently filtering the plastic melt. For this purpose, so-called melt filtration units are used, by means of which the foreign metal or nonmetal substances or higher-melting plastics are separated. To make possible a continuous and troubleproof filtration, however, the melt filtration units must be continuously cleaned.

German Patent No. DE 43 08 685 C2 describes a generic separating unit in which the contaminated plastic melt is pressed into the inside chamber of a filtration body having the shape of a hollow cylinder and being disposed in a housing. Coaxially disposed thereto in the inside chamber of the filtration body is a rotary-drive scraper shaft which, together with the inside wall of the filtration body, defines an inside annular chamber and which, along its outside, has a plurality of scrapers that run at an oblique angle with respect to the direction of the axis and which together constitute a helical screw. The residues retained by the filtration body on its inside surface are scraped off by the scrapers and, through the rotation of the scraper shaft, are transported to a material outlet point along the filtration body, which material discharge point is located axially opposite the inlet end of the inside annular chamber. In this embodiment, the transporting path for discharging the residues, however, extends across the entire inside surface of the filter, which can quickly put considerable strain on the filtration body, especially if the residues are hard and abrasive. Furthermore, because of the axial movement of the residues along the filter, the filter openings can easily become clogged. In addition, the filtration body of this known separating unit is supported on the housing by means of a constructively complex supporting unit.

German Patent No. DE 32 39 030 A1 describes another separating unit for recycling mixtures of thermoplastic materials and material waste. In this case, the inside chamber of a filtration body in the shape of a hollow cylinder also carries a rotary-drive scraper shaft, on the outside circumference of which scrapers are disposed so as to be staggered with respect to one another both in the axial and in the circumferential direction. Disposed in the filtration body are oppositely placed slotlike outlet openings to which the residues that accumulate on the inside surface of the filtration body are transported by the scrapers as a result of the reciprocating rotary movement of the scraper shaft. However, in this case, the residues being transported to the two outlet openings are again moved for a relatively long time along the inside wall of the filter.

Thus, the problem to be solved by the present invention is to make available a device of the type mentioned in the introduction which makes it possible for the separated residues to be removed from the surface of the filter as fast as possible.

SUMMARY OF THE INVENTION

This problem is solved by the present invention by providing a device with the novel characteristics as will hereinafter be described in detail. Various useful improvements and advantageous embodiments of the invention are discussed in the following.

An important advantage of the device according to the present invention is that the filter residues are lifted from the surface of the filter without further touching the filter. During filter cleaning, the residues are not pushed along the surface of the filter, thus reducing the wear and tear and making it possible to improve the stability of the device. Because of the lower abrasive wear of the filter, it is also possible to use less expensive filters of a less complex construction.

A filter that can be easily manufactured comprises a filter tube on which a plurality of thru openings are disposed and which is supported by a supporting body. The filter tube is preferably made of a wear-resistant material to which optionally an additional coating can be applied. The thru openings preferably have a cross section that widens in the direction of flow and can have the form of conical borings produced, e.g., by electron ray or laser processing. The supporting body is preferably a hollow cylinder which, on the bearing surface for the supporting tube [sic], has a number of circumferential collecting grooves with narrow riblike contact members in between. Thus, an inexpensive filter with a large open filter surface is made possible. The filter is extremely wear-resistant and, if necessary, can be easily replaced.

The material removed by the scraper is preferably transported off by means of a conveying device. The filter and the conveying device can be driven separately, thus making it possible to separately control the cleaning rate and the rate at which the foreign substances are discharged. This type of control makes it possible to obtain a very high concentration of foreign substances and thus a high yield of the primary material. In one useful embodiment, the conveying device is a motor-driven rotary-drive conveying screw. The rotational speeds of the filter and of the conveying screw can be controlled separately of each other, which makes it possible to obtain a very high concentration of impurities and simultaneously have an optimum active filter surface. Depending on the type of plastic involved, the filter and the conveying screw can have identical or opposite directions of rotation.

BRIEF DESCRIPTION OF THE DRAWINGS

Additional features and advantages of the invention follow from the description of a preferred practical example shown in the drawing. As can be seen.

DETAILED DESCRIPTION OF PREFERREED EMBODIMENTS OF THE INVENTION

Figures 1, 2:
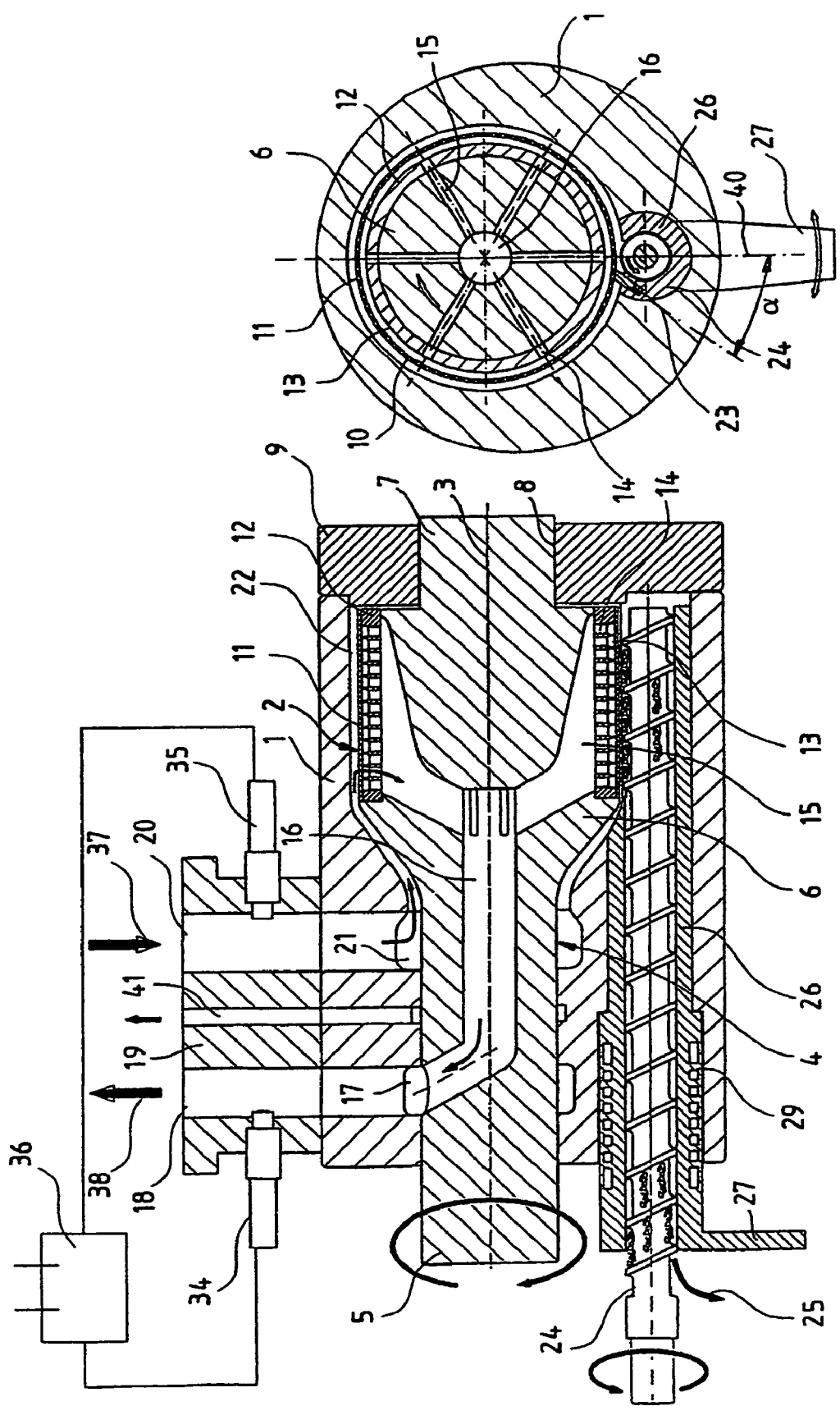
FIG. 1 shows a longitudinal section through a first practical example of a separating unit.
FIG. 2 shows a cross section of the separating unit seen in FIG. 1.

The separating device for filtering contaminated plastic melts diagrammatically shown in FIG. 1 comprises a housing 1 in which a melt filtration unit 2 in the shape of a hollow cylinder is disposed so as to be able to pivot about the axis of rotation 3. The melt filtration unit 2 is mounted on a motor-driven rotary-drive carrier shaft 4. This carrier shaft comprises a relatively slim drive element 5 that is disposed inside housing 1, a wider bearing element 6 for melt filtration unit 2, and a slimmer journal 7 which is pivoted in a suitable boring 8 of a bearing cap 9 that is attached to housing 1.

Figure 5:
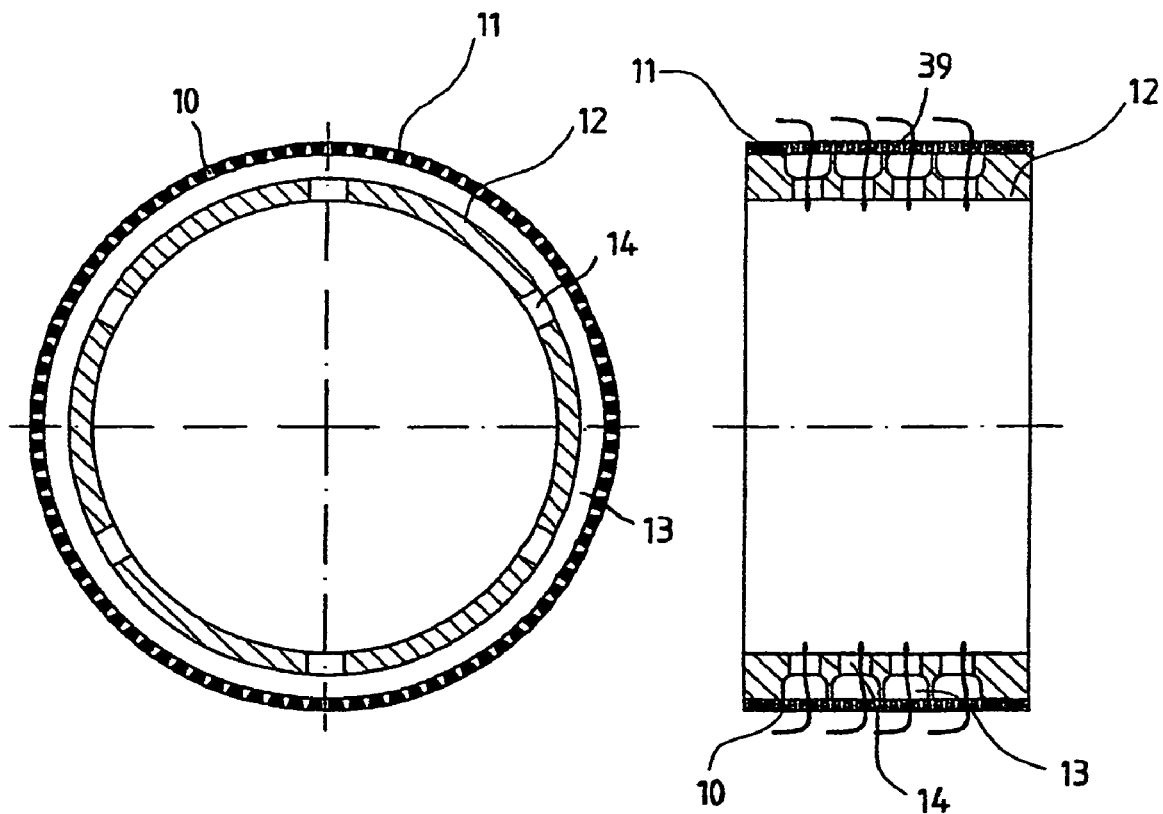
FIG. 5 shows a cross section of and a longitudinal section through a first practical example of a filtration body.

The melt filtration unit 2, which is shown enlarged in FIG. 5, comprises a filter tube 11 which has a plurality of radial thru openings 10 and a hollow cylindrical supporting body 12 which is form-fittingly connected to the carrier shaft 4 and onto which filter tube 11 is shrink-fitted. The strainer-like filter tube 11 can be fashioned, e.g., from sheet steel with thru openings 10, which is bent so as to form a tube and subsequently contact welded. It is preferably manufactured from wear-resistant and corrosion-resistant steel and then hardened. The filter tube can also be coated with surface coatings which improve the wear resistance and other properties. The thru openings 10 are borings with a cross section that widens in the direction of flow. In the practical example shown in FIG. 5, the thru openings 10 have a cross section that conically tapers toward the outside. On the outer surface, the hollow cylindrical supporting body 12 has a number of collecting channels 13 which are designed as circumferential grooves or as a square thread and from which several radial flow-off borings 14, which, in the peripheral direction, are equiangularly spaced, extend inward.

As FIGS. 1 and 2 show that the radial flow-off borings 14 open out into axial collecting slots 15 which, inside the carrier shaft 4, are disposed at angular distances identical to those of the flow-off borings across the circumference of the widened bearing element 6, and form an inside chamber for the collection of the filtered material. The collecting slots 15 that widen in the direction of flow lead to a central collecting channel 16, which via a chamfered section, opens out into a first annular channel 17 inside housing 1. Inside housing 1, a first lateral boring leads from the first annular channel 17 to an outlet opening 18 of a connecting sleeve 19. Inside the connecting sleeve 19, there is also an inlet opening 20, which via a second lateral boring inside housing 1, leads to a second annular channel 21 in housing 1. This annular channel 21 communicates with an annular chamber 22 which is defined by the inside wall of housing 1 and the outside wall of filter tube 11.

Figure 3:
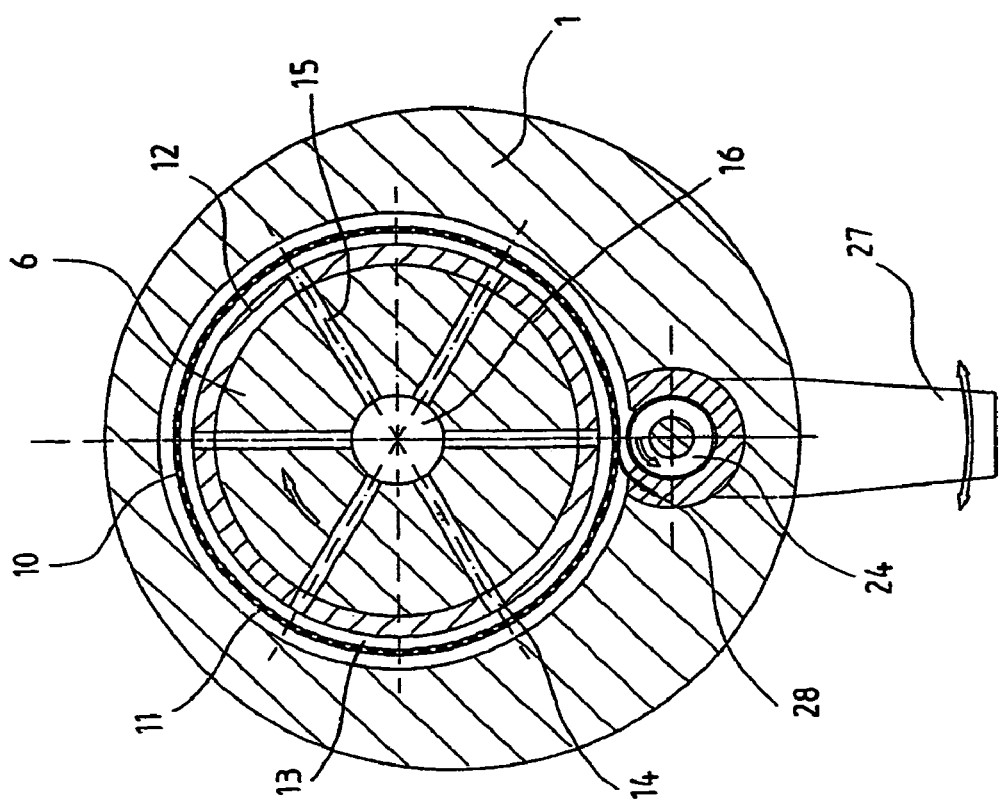
FIG. 3 shows a cross section of a second practical example of a separating unit.

As FIG. 2 shows, a wiper in the form of a scraper knife 23, which, in the axial direction, extends along the entire length of the filter tube and rests against the external surface of said filter tube, is disposed in the lower portion of housing 1 so that the residues or impurities that are retained on filtration body 2 are transported off in the radial direction. Scraper knife 23 is disposed at an oblique angle with respect to the outer surface of filtration body 2 and at a slant toward the direction of rotation of said filtration body. In the embodiment shown, the scraper knife is disposed at an angle of pitch α of approximately 45° with respect to a median plane 40 of filter tube 11. In the immediate vicinity of scraper knife 23 inside housing 1, a conveying screw 24 is disposed parallel to the axis of rotation 3 of filtration body 2, which conveying screw 24 extends along the outer surface of the filtration body up to an outlet opening. The conveying screw is disposed so as to ensure that the residues that are radially scraped off by means of scraping knife 23 are immediately fed to conveying screw 24 and are transported to the outside by said conveying screw in the direction indicated in FIG. 1 by arrow 25. In the embodiment shown in FIG. 2, the scraper knife is attached to a hollow shaft 26, which surrounds conveying screw 24 and which is pivoted within housing 1 and which can be pivoted via an adjusting lever 27. In this manner, it is possible to change the angle of pitch a and the contact pressure of scraper knife 23. The wiper can also be designed in the form of a spring blade 28 as shown in FIG. 3. In hollow shaft 26, cooling channels 29 are disposed in the area of the material outlet point of conveying screw 24. Via these cooling channels, the material being transported by conveying screw 24 can be cooled so as to form a thermal barrier.

Figure 4:
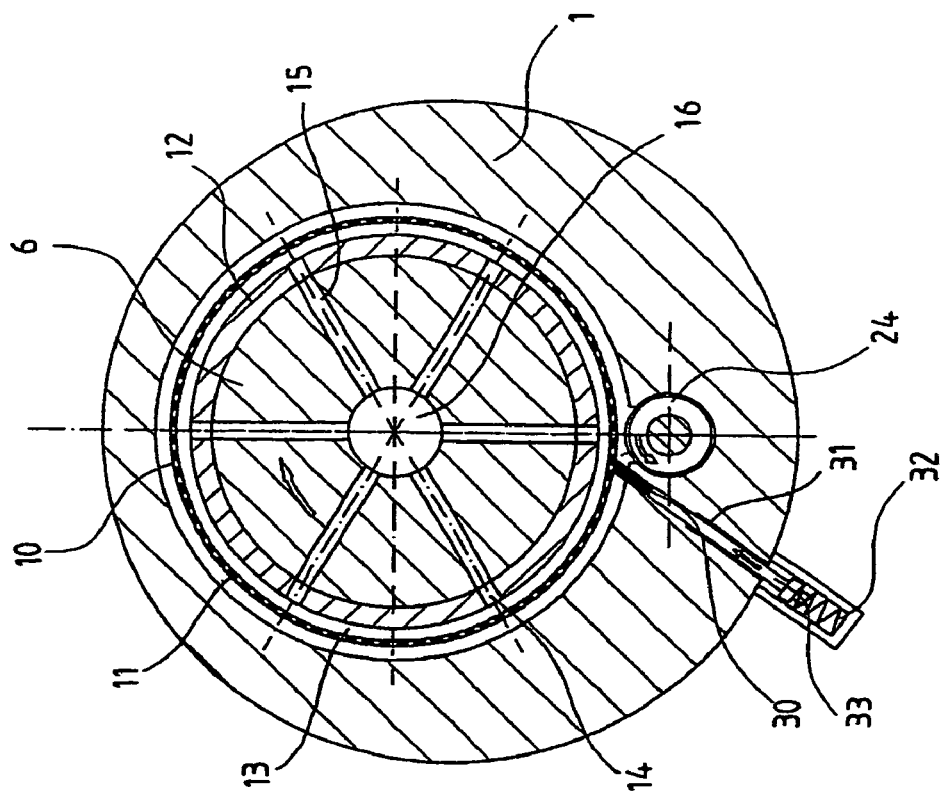
FIG. 4 shows a cross section of a third practical example of a separating unit.

The wiper can also be mounted at a predetermined angle within housing 1 as shown in FIG. 4. There, the blade or a scraper knife 30 is slidably supported in an oblique boring 31 in housing 1 and pressed against the external surface of filter tube 11 by means of a guide bolt 33 that is actuated by a spring 32 or hydraulic cylinder.

On connecting sleeve 19, an inlet-side melt pressure sensor 35 is disposed in the area of inlet opening 20 and an outlet-side melt pressure sensor 34 is disposed in the area of outlet opening 18. These melt pressure sensors are connected to an electronic control unit 36, which controls the filtration unit. Thus, via electronic control unit 36, the rotary movement-of-melt filtration unit 2 and conveying screw 24 can be controlled as a function of a detected pressure differential. This makes it possible to intermittently allow melt filtration unit 2 and conveying screw 24 to rotate within the limits of two predetermined pressure values (maximum/minimum) and thus to reduce the wear and tear. Disposed between inlet opening 20 and outlet opening 18 is a drainage channel 41 that passes through connecting sleeve 19 and housing 1. This ensures that foreign substances are prevented from entering the bearing on the GO side.

Figure 6:
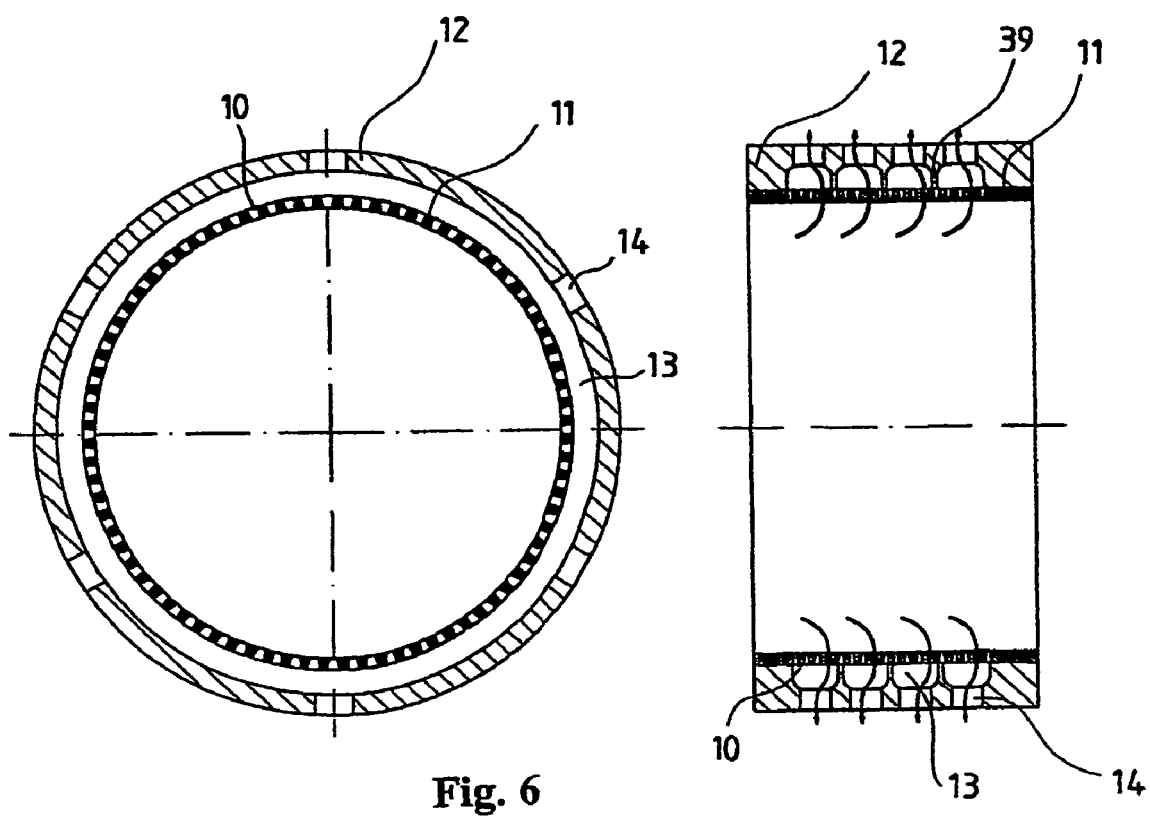
FIG. 6 shows a cross section and a longitudinal section through a second practical example of a filtration body.

FIG. 6 shows a second application example of an easily producible and inexpensive filter that is suitable for use in a melt filtration unit in which the flow is not directed from the outside to the inside, but instead from the inside to the outside. There, filter tube 11 is disposed on the inner surface of supporting body 12 and has thru openings 10 that radially widen toward the outside. On this supporting body 12, the circumferential collecting channels 13 are disposed along the inner surface, and the flow-off borings 14 are disposed on the outer surface. Both in this embodiment and in the embodiments shown in FIG. 5, thin riblike elements 39 are disposed between collecting channels 13 so as to support filter tube 11.

In the unit described above, the contaminated material blend (predominantly a plastic melt), as illustrated in FIG. 1, is pressed at inlet opening 20 under pressure in the direction of arrow 37 into the annular chamber 22 and through the small thru openings 10 in filter tube 11 of rotating filter 2. Via filter tube 11 and supporting body 12 with collecting grooves 13 and flow-off borings 14, the filtered material is moved by carrier screw 6 to outlet opening 18 where it can be removed as indicated by the direction of arrow 38. The residues retained on filter tube 11 are lifted by wiper 23 as filter tube 11 rotates and are immediately transported to the rotating conveying screw 24, without making further contact with the filter. Subsequently, the residues are transported by the conveying screw to an outlet from which they can be discharged in the direction of arrow 25.

The invention is not limited to the practical example described above. Thus, e.g., filtration can also take place with the direction of flow being directed from the inside toward the outside.

What is claimed is:

1. A device for the continuous filtration of material blends, in particular for separating impurities from plastic melts, comprising a housing; a hollow cylindrical filter disposed inside the housing; an inside chamber disposed inside the filter; an annular chamber defined by the outer surface of the filter and an inside wall of the housing; a cleaning device for removing the impurities retained on the filter; a motor drive about an axis coupled to pivot the filter inside the housing; the cleaning device being comprised of at least one wiper for removing in the radial direction impurities retained on the filter and a conveying device for transporting off the impurities removed from the filter by the wiper, and wherein the motor-driven filter and the conveying device are driven separately of each other.

2. A device as in claim 1, wherein the wiper is disposed at an oblique angle with respect to the filter.

3. A device as in claim 1, wherein the wiper is disposed at an angle of pitch (α) with respect to a median plane of the filter.

4. A device as in claim 3, wherein the angle of pitch (α) of the wiper can be changed.

5. A device as in claim 1, wherein the wiper is disposed on a shaft that is pivotably disposed inside the housing.

6. A device as in claim 1, wherein the conveying device is a motor-driven conveying screw that is disposed parallel to the axis of rotation of the filter.

7. A device as in claim 6, wherein the rotational speed of the filter and the rotational speed of the conveying device are controllable separately of each other.

8. A device as in claim 6, wherein the wiper is disposed in the immediate vicinity of the conveying screw.

9. A device as in claim 1, wherein the filter comprises a filter tube supported by a supporting body, the filter tube having a plurality of thru openings that widen in the direction of flow.

10. A device as in claim 9, wherein the supporting body comprises several circumferential collecting grooves with narrow rib-like elements disposed in between that support the filter tube.

11. A device as in claim 1, wherein the filter is removably mounted on a carrier shaft that is pivotably disposed in the housing.

12. A device as in claim 11, wherein the carrier shaft has several collecting slots that form the inside chamber.

13. A device as in claim 1, wherein the wiper is a scraper knife that is pressed against the filter by means of a spring.

14. A device as in claim 1, wherein the wiper is a spring blade.

15. A device as in claims 6, wherein the filter and the conveying device have one of identical and opposite directions of rotation.

* * * * *